United States Patent
Berube et al.

(10) Patent No.: US 7,201,888 B2
(45) Date of Patent: Apr. 10, 2007

(54) NANOSIZED SILVER OXIDE POWDER

(75) Inventors: Gregory M. Berube, Bloomsbury, NJ (US); Gargi Banerjee, Kendall Park, NJ (US)

(73) Assignee: Ferro Corporation, Cleveland, OH (US)

( * ) Notice: Subject to any disclaimer, the term of this patent is extended or adjusted under 35 U.S.C. 154(b) by 606 days.

(21) Appl. No.: 10/680,872

(22) Filed: Oct. 7, 2003

(65) Prior Publication Data
US 2005/0074394 A1    Apr. 7, 2005

(51) Int. Cl.
*C01G 5/00* (2006.01)
(52) U.S. Cl. .................. 423/604; 423/23; 423/42
(58) Field of Classification Search ............ 423/604, 423/23, 42
See application file for complete search history.

(56) References Cited

U.S. PATENT DOCUMENTS 4,080,210 A      3/1978   Asada et al.
4,298,506 A  *  11/1981   Przybyla et al. ......... 252/520.3

FOREIGN PATENT DOCUMENTS

JP           56-5323 A   *   1/1981
JP       2004-292894 A   *  10/2004

OTHER PUBLICATIONS

Derwent Abstract for Japanese Publication No. 51139189A published Nov. 30, 1976, three pages.

Derwent Abstract for Japanese Publication No. JP02004203696A published Jul. 22, 2004 with copy of Japanese patent attached, 11 pages.

Chow et al., "Chemical Synthesis And Processing Of Nanostructured Powders And Films," published Jan. 1999, pp. 3-50.

Mann et al., "Precipitation Within Unilamellar Vesicles. Part 1. Studies Of Silver Oxide Formation," J. Chem. Soc. Dalton Trans. 1983, pp. 311-316.

* cited by examiner

*Primary Examiner*—Stanley S. Silverman
*Assistant Examiner*—Timothy C. Vanoy
(74) *Attorney, Agent, or Firm*—Rankin, Hill, Porter & Clark LLP

(57) ABSTRACT

The present invention provides silver oxide particles having an average diameter of less than or equal to 100 nm that are stable and can be transported in dry powder form. The surface of the silver oxide particles is coated with an extremely thin layer of a surfactant such as fatty acid. Nanosized silver oxide particles according to the invention are preferably formed via the addition of a strong base to a mixture including an aqueous silver salt solution and a surfactant dissolved in an organic solvent that is at least partially water miscible. The strong base causes silver oxide to precipitate from the mixture as nanosized particles, which are immediately encapsulated by the surfactant and thus protected from further crystal growth and Ostwald ripening. The nanosized surfactant coated particles of silver oxide can be washed and dried and then transported in dry form.

17 Claims, 4 Drawing Sheets

NANOSIZED SILVER OXIDE POWDER

BACKGROUND OF THE INVENTION

1. Field of Invention

The present invention relates to nanosized silver oxide powder and a method of making the same.

2. Description of Related Art

Powdered silver oxide ($Ag_2O$) is used in a variety of applications such as, for example, in the formulation of ink compositions for forming conductive films in electronic devices, as a reactant or catalyst in chemical reactions and in the formulation of antimicrobial compositions. In many applications, it is advantageous for the powdered silver oxide to have an extremely small particle size. Smaller particles have more surface area than larger particles per unit of mass, which means that smaller particles tend to exhibit enhanced reactivity as compared to larger particles. Moreover, under certain circumstances, silver oxide having an extremely small particle size can be reduced to silver metal at temperatures below 100° C., which can be advantageous in particular applications such as in the formation of electrically conductive thin films.

A common method of producing silver oxide powder is to react an aqueous silver nitrate solution with an aqueous sodium hydroxide solution to precipitate silver oxide according to the following reaction:

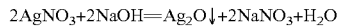

$$2AgNO_3 + 2NaOH = Ag_2O\downarrow + 2NaNO_3 + H_2O$$

This reaction, when run at a 63.4% $AgNO_3$ (40.3% Ag by weight) concentration by weight in $H_2O$ and 50% NaOH concentration by weight in $H_2O$ at 100° C., is known to precipitate silver oxide particles that have an average diameter (also sometimes referred to as "particle size") of about 2 μm. Asada et al., U.S. Pat. No. 4,080,210, disclose a method and apparatus for preparing silver oxide particles that utilizes the same chemical reaction, but at different reaction conditions, which produces silver oxide particles having an average particles size of about 0.3 to 0.6 μm.

By decreasing the concentration of the reactants to 5% and by running the chemical reaction at a temperature of about 22.5° C., applicants were able to precipitate silver oxide having an initial average particle size of about 150–200 nm, as determined via measurements made using a scanning electron micrograph (SEM). Unfortunately, the 150–200 nm precipitated silver oxide particles were unstable, meaning that the particle size was observed to increase over a relatively short period of time until the particles exhibited an average particle size of about 0.3 to about 1.8 μm, as determined by SEM measurements.

The undesirable increase in particle size of conventional nanosized silver oxide powder is most likely attributable to Ostwald ripening, which states that in a system of pure crystals of various sizes under a mother liquor, smaller crystals will tend to dissolve and re-precipitate out on the surface of larger crystals thereby increasing the average crystal size of the product. Investigation of the growth of nanosized silver oxide particles suggests that the Ostwald ripening effect is most significant during the initial precipitation step prior to filtration and during water washing.

BRIEF SUMMARY OF THE INVENTION

The present invention provides silver oxide particles having an average diameter of less than or equal to 100 nm that are stable and can be transported in dry powder form. At least a portion of the surface of the silver oxide particles is coated with an extremely thin layer of a surfactant such as fatty acid.

Nanosized silver oxide particles according to the invention are preferably formed via the addition of a strong base to a mixture including an aqueous silver salt solution and a surfactant dissolved in an organic solvent that is preferably at least partially water miscible. The strong base causes silver oxide to precipitate from the mixture as nanosized particles, which are immediately at least partially coated by the surfactant and thus protected from further crystal growth and Ostwald ripening. The nanosized surfactant coated particles of silver oxide can be washed and dried and then transported in dry form.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

The present invention provides a method for making stable nanosized silver oxide particles. Throughout the instant specification and in the appended claims, the term "nanosized" means particles having a diameter of 100 nm or less. The term "stable" means that the average particle size (i.e., average diameter of the particles) does not substantially increase during the 180 days immediately following the date when the silver oxide powder was formed, and thus the average particle size of the silver oxide powder remains less than about 100 nm over such time period.

Figure 1:
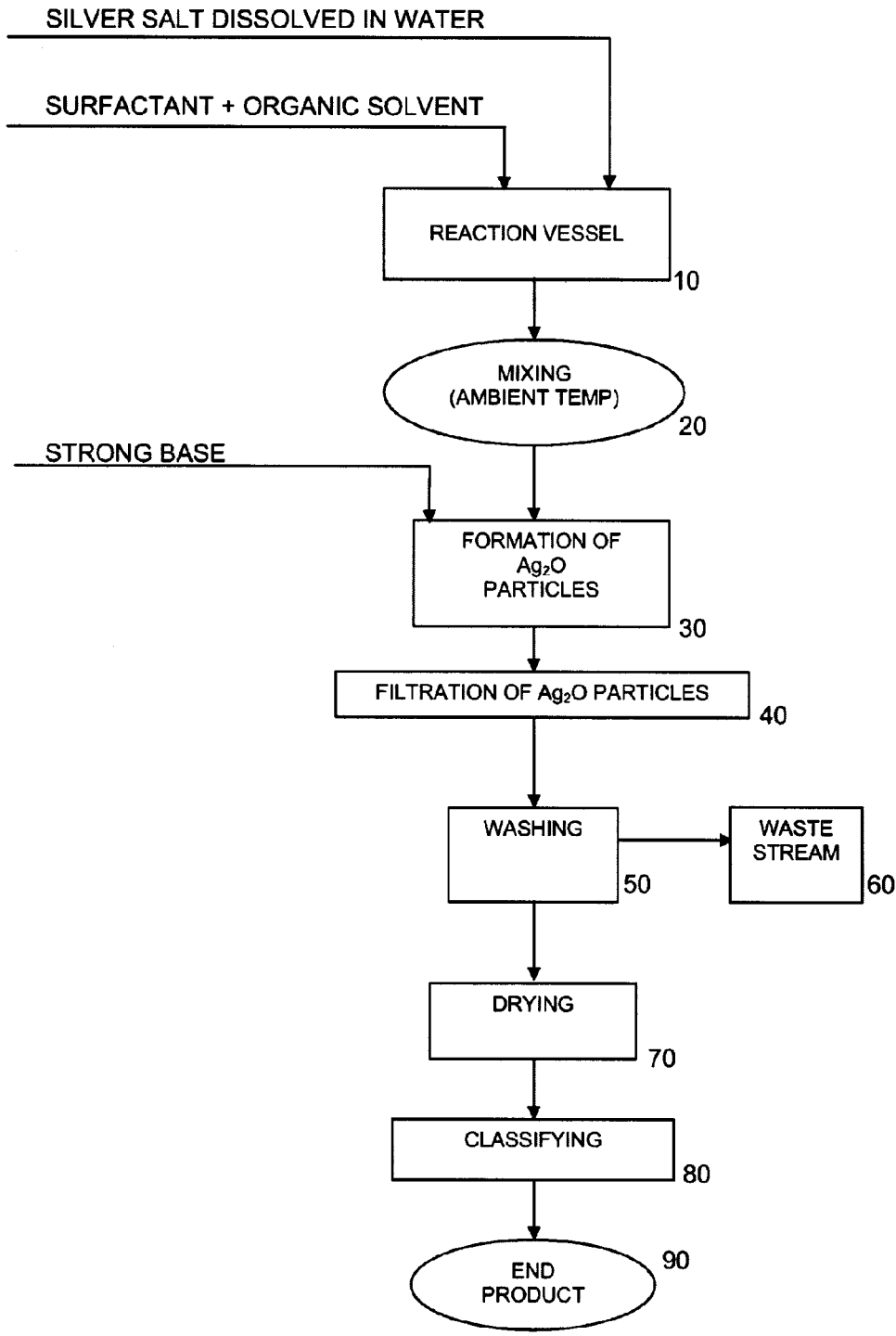
FIG. 1 is a process flow diagram for the production of nanosized silver oxide powder in accordance with a preferred embodiment of the invention.

The method of the invention can best be described with reference to FIG. 1, which is a process flow diagram showing the steps employed to produce nanosized silver oxide powder according to a preferred embodiment of the present invention. First, a solution comprising a silver salt dissolved in deionized water is contacted with an organic solvent and a surfactant in a reaction vessel 10. The contents of the reaction vessel are subjected to mixing 20 at ambient temperature, typically from about 20–25° C., until a homogeneous solution is obtained. Throughout the instant specification and in the appended claims, the term "mixture" is used to describe the homogenous combination of the silver salt, deionized water, organic solvent and surfactant. It will be appreciated that in most instances this homogenous mixture will be in the form of a milky appearing emulsion, and not a clear solution. Thus, the term "mixture" is broadly intended to encompass both emulsions and clear solutions.

Virtually any water-soluble or partially water-soluble silver salt can be used in the present invention. However, when a partially water-soluble silver salt is used, the concentration of the silver salt in water must be low (i.e., an extremely dilute system). Examples of water-soluble silver salts for use in the invention include silver nitrate, silver fluoride, silver chlorate and silver perchlorate. Examples of partially water-soluble silver salts for use in the invention include silver acetate and silver sulfate. The silver salts identified herein are not intended to be an exhaustive list of suitable silver salts, but only exemplary of the types of silver salts that can be used in the invention. In view of factors such as solubility in water, cost, commercial availability, safety and waste handling and treatment, silver nitrate is presently the most preferred silver salt for use in the invention. The silver salt solution should be somewhat dilute. A concentration of from about 2% to about 5% by weight of dissolved silver metal from silver nitrate in deionized water is presently considered to be optimal.

The organic solvent used in the invention is preferably at least partially miscible with water, which aids in the formation of a homogenous solution. More preferably, the organic solvent is completely miscible with water. The most preferred organic solvent for use in the invention is acetone, which is completely miscible with water. In addition to being miscible with water, acetone has a low boiling point of 56° C. and is inert. It can easily be removed from $Ag_2O$ powder by evaporation under mild heating conditions. Since $Ag_2O$ is a strong oxidizer, it has the potential to catalytically decompose some higher boiling organic solvents during the removal process, while reducing itself to pure silver metal.

If use of an organic solvent other than acetone is desired, it is preferable that the organic solvent exhibits a polarity that is similar to, but not significantly higher than, acetone. Solvents having a higher polarity than acetone such as methanol and ethanol, for example, failed to produce stable nanosized $Ag_2O$ particles when such solvents were substituted for acetone under the same reaction conditions. Applicants hypothesize that organic solvents that are significantly higher in polarity than acetone produce the same reaction conditions as a conventional water-only systems produce, which is undesirable. The volume ratio of silver salt solution to organic solvent is preferably within the range of from about 2:1 to about 10:1, with about 5:1 presently being considered optimal.

The surfactant used in the method of the invention is preferably soluble in the organic solvent but substantially insoluble in water. Surfactants possessing these attributes facilitate the formation of a homogeneous mixture (emulsion). Most importantly, the surfactant must have an affinity for silver oxide. In view of these factors, the preferred surfactants for use in the invention are fatty acids such as oleic acid, and derivatives of fatty acids.

It is essential that a surfactant is present in the reaction, but only a small amount need be present. When no surfactant is present in the reaction, the particle size of the silver oxide powder will be larger than 100 nm upon formation, and will disadvantageously increase over time. At very low surfactant concentrations (e.g., 0.01% wt by weight of the dissolved silver metal in the silver salt solution), the particle size of the silver oxide powder will also tend to be greater than 100 nm. At 0.1% by weight of surfactant, the particle size of the silver oxide particle will be about 100 nm, but some particle size increase may occur over time. Once the surfactant concentration meets a threshold value, which approaches about 1.0% by weight, the silver oxide particle size will remain below 100 nm, and the powder will remain stable. At higher concentrations of surfactant, nanosized particles are formed, but the powder becomes "soft", meaning that it contains or supports larger percentages of organic material. Accordingly, the amount of surfactant present in the reaction will preferably be less than 2% by weight of the dissolved silver metal in the silver salt solution used in the reaction. About 1.0% by weight oleic acid by weight of dissolved silver metal in the silver nitrate solution is presently considered to be optimal.

The formation of a homogeneous mixture is essential to successfully carrying out the reaction. Thus, use of at least partially water-miscible organic solvents is preferred, because in combination with a substantially water insoluble surfactant, a stable emulsion can be formed. An emulsion advantageously puts all of the reactants in close proximity to each other, which allows for rapid protection of the silver oxide particles. Use of water immiscible organic solvents such as mineral oil makes operation of the reaction difficult.

Once the aqueous silver salt solution and organic solvent/ surfactant mixture have been well mixed to form a homogeneous mixture, a strong base is added to the reaction vessel under continued mixing 30. The preferred strong bases for use in the reaction are sodium hydroxide and potassium hydroxide, with sodium hydroxide being presently most preferred. However, virtually any base of an element from Groups IA and IIA of the Periodic Table of Elements can also be used. The amount of base used is preferably equimolar with the amount of silver salt present in the reaction vessel, which minimizes the potential for impurities in the precipitated powder.

The strong base causes solid particles of silver oxide to nucleate and precipitate from the solution. The solid particles of silver oxide appear as a dark brownish-black precipitate. Applicants believe that the surfactant molecules present in the reaction vessel coat the surface of the solid silver oxide particles immediately as they form, which retards continued crystal growth and reduces the likelihood of surface-to-surface particle contact. The surfactant molecules orient on the surface of the solid silver oxide particles with their polar head adjacent to the silver oxide particles and their non-polar tail extending away from the surface of the particles. The diameter of the solid particles precipitated from solution is typically less than about 100 nm. The ionic strength of the solution is too strong to keep the particles suspended in a colloidal state, so the particles tend to settle to the bottom as soon as stirring is discontinued.

The amount of surfactant present in the reaction mixture determines, to some extent, the degree to which the silver oxide particles become coated or encapsulated thereby. Applicant believes that when the amount of surfactant used in the reaction mixture is optimized, a mono-molecular layer or film of surfactant can be formed on the surface of the silver oxide particles, forming an encapsulating closed shell. However, it may be the case that only a portion or a part of the silver oxide particles become coated with surfactant. Thus, throughout the instant specification and in the appended claims, the terms "encapsulated" and "coated" should be understood to mean that at least a portion of the surface of the particle has a surfactant molecule ionically bonded thereto. But, the terms should not be interpreted as meaning that the entire surface of the silver oxide particle is covered by surfactant or that the particle is completely encapsulated by surfactant.

The solid particles of surfactant-coated silver oxide can be separated from the liquid phase by filtration 40. Depending upon the size of the particles, various conventional filtration methods can be employed. In the laboratory, nanosized solid particles of silver oxide are most conveniently separated from the liquid phase by passing the contents of the reaction vessel through a Whatman #52 filter using a conventional Büchner filtering set up.

The wet precipitate should be washed 50 with deionized water. Preferably, the wet precipitate is washed with deionized water until the wash water exhibits a desired conductivity and pH. The water-washed precipitate should then be treated with acetone, which removes excess water and excess (free) fatty acid from the particles. The removal of excess water has been determined to be essential in order to prevent crystal grown. Not all of the fatty acid molecules ionically bonded to the surface of silver oxide particles is removed during the acetone wash. Many fatty acid molecules remain ionically bonded to the surface of the silver oxide particles. The post-wash acetone can be collected as a waste stream 60 and recycled for additional use.

Washing the $Ag_2O$ particles with water reduces the sodium content of the powder, but it also reduces product yield because $Ag_2O$ is slightly soluble in water. The non-washed precipitated $Ag_2O$ powder has a high yield of greater than 99.0%, but such powder also exhibits relatively high sodium content for use in electronic applications (~114 ppm). When the $Ag_2O$ particles are washed with water until the conductivity of the effluent is less than or equal to 30 μs and the pH is less than or equal to 7, the final $Ag_2O$ powder exhibits a sodium content of less than 1 ppm, but the yield is reduced to only about 93–94%. To achieve a good balance between the competing forces of high product yield and low sodium content, washing is preferably continued only until the effluent is reduced to 100 μs, which reduces the sodium content to less than about 20 ppm and improves product yield to commercially acceptable levels. Typically, the conductivity of the wash water effluent will measure about 80 μs.

The de-watered silver oxide precipitate may then be dried 70. In some applications, however, drying is not necessary. Drying is preferably accomplished as a two-stage process: (1) air-drying followed by (2) drying in a vacuum oven under $N_2$ at 45° C. The powder recovered after drying will consist of substantially discrete nanosized silver oxide particles that are coated with a very thin layer of surfactant. The nanosized silver oxide powder may also contain a small amount of AgOH (typically within the range of from about 1% to 2% by weight, or less), which is a by-product of the reaction.

After drying, the powder is preferably subjected to classification 80, which is typically accomplished by screening the powder through a 100-mesh sieve to remove any aggregates that may have been created during precipitation and drying. After classification, the end product 90 will comprise nanosized silver oxide particles that have very thin coating of the surfactant.

It is known that the reaction between sodium hydroxide and silver nitrate in water to produce silver oxide is influenced by the temperature and concentration of the reactants. At higher concentrations (e.g., 40% or higher by weight of both reactants in water) at a temperature of 100° C., the particle size of the silver oxide formed is about 2.0 μm. By diluting the concentration of the reactants to about 5% and lowering the temperature of the reaction to room temperature, it is possible to form silver oxide particles having an initial particle size of less than about 100 nm. But such particles are not stable and grow in size upon standing. The present invention modifies the reaction process and in so doing coats the surface of the silver oxide particles formed with a thin layer of a surfactant, which inhibits particle contact and growth.

As noted above, it has not been possible to generate stable silver oxide particles having a diameter of less than or equal to 100 nm in purely aqueous systems. Although it is possible to form silver oxide particles of that size in a purely aqueous system, the particles tend to increase in size in a relatively short period of time due to Ostwald ripening. In the present invention, however, the surfactant present on the surface of the particle acts as a crystal growth inhibitor. As the silver oxide particles precipitate from the solution, they are believed to be at least partially encapsulated within closed shells defined by the surfactant and thus are protected from further crystal growth. The presence of the small amount of surfactant on the surface of the particle is sufficient to prevent Ostwald ripening. Furthermore, the small amount of surfactant residue remaining on the particles has no effect on end use of the particles, and in some instances allow for use of the powder in applications where silver oxide could not previously be used.

Unlike wholly aqueous processes known in the prior art, the process of forming silver oxide according to the present invention does not appear to be influenced significantly by changes in temperature, mixing conditions and addition time. For example, varying the % Ag concentration in the $AgNO_3$ solution from 5% by weight to 10% by weight did not produce a change in particle size. Similarly, no change was observed in the size of the resulting particles whether the reaction was operated at 15° C. or at 25° C. or at 50° C. (testing was not conducted above 50° C. because acetone boils at 56° C.). Varying the mixing speed from 600 rpm to 1000 rpm did not produce a change in particle size. And, the speed at which the strong base was added to the reaction also had no effect on the size of the resulting silver oxide particles.

It may be possible to practice the process according to the invention as a continuous process rather than a batch process. In a continuous process, the reactants would be "jet-mixed" in a moving stream, with the resulting silver oxide product recovered after sufficient mixing.

Nanosized silver oxide powder according to the present invention has enhanced reactivity as compared to larger particles due to its higher surface area per unit weight. In certain applications, the nanosized silver oxide powder can be reduced to silver metal at extremely low temperatures (e.g., under 100° C. in some instances). The smaller particle size also has an advantage in antimicrobial applications, where a smaller effective amount of the compound may be required for the same efficacy.

The powder can be used in any application where conventional silver oxide powder has been used. The material is particularly suitable for use in the formulation of electronic inks for conductive films. The material may also find use as a potential antimicrobial material due to the bound nature of the silver ion. The material can be absorbed into or onto a substrate for use in antimicrobial applications. As a biocide, it can be used in water purification. The material can also be used as catalyst in chemical reactions and in the production of batteries.

The following example is intended only to illustrate the invention and should not be construed as imposing limitations upon the claims.

EXAMPLE 1

25 liters of deionized water were charged to a 25-gallon reaction vessel equipped with a 5" 3-blade overhead stirrer. The stirrer was adjusted to 850 rpm. 1574.1 grams of silver nitrate crystals were then charged to the reaction vessel under stirring until completely dissolved. Thus, the concentration of $AgNO_3$ in the solution was 6.30% by weight, and the concentration of Ag in the solution was 4.0% by weight. No effort was made to control the temperature of the reactor contents, which were determined to be about 22.5° C.

11 grams of oleic acid were added to and intimately mixed with 5000 cc of acetone. The oleic acid/acetone mixture was then added to the reaction vessel containing the aqueous silver nitrate solution and mixed at 850 rpm until the contents of the reaction vessel were homogeneous. No effort was made to control the temperature of the reactor contents, which were determined to be about 22.5° C.

370.4 grams of sodium hydroxide pellets were dissolved in 7040 grams of deionized water in a 10-liter stainless vessel. Thus the concentration of NaOH in the solution was 5.3% by weight. The aqueous sodium hydroxide solution was then pumped into the reaction vessel at a steady rate using a Masterflex pump. The sodium hydroxide feed took about 70 minutes to complete. Mixing at 850 rpm continued throughout the feed. No effort was made to control the temperature of the reactor contents. Addition of the sodium hydroxide created a small, but noticeable, exotherm.

Upon the addition of the sodium hydroxide, dark brownish-black silver oxide particles began to form in the reaction vessel. Upon completion of the sodium hydroxide solution addition, the overhead stirrer was turned off and the silver oxide particles were allowed to settle.

An 8-inch diameter Büchner funnel lined with Whatman #52 filter paper was set up. The wet powder from the reaction vessel was transferred to the Büchner filtering set up using a vacuum bottle and filtered. The powder collected on the surface of the filter paper was thoroughly washed with deionized water. Care was taken to ensure that the powder bed did not dry or crack during washing. Washing was continued until the pH of the wash water effluent was determined to be less than or equal to 7 (the pH of the deionized water used for washing was slightly lower due to traces of hydrogen ion in the water). Once the pH of the wash water effluent was determined to be less than or equal to 7, the conductivity of the wash water effluent was tested to confirm that it was less than 100 μs (it was 80 μs).

After the powder was thoroughly washed with deionized water, the powder was thoroughly washed with acetone. Acetone removed residual water from the powder and also removes excess oleic acid from the surface of the silver oxide particles. A total of about 10 liters of acetone was used to wash the solid particles. The acetone wash effluent was collected and recycled for future use.

After the acetone washing was completed, the powder was air dried on the Büchner filter with vacuum for 24 hours. The air-dried powder was transferred into a porcelain dish then placed in a vacuum oven at 45° C. with a dry nitrogen atmosphere for 24–36 hours. The resulting dry powder was screened through a 100 mesh screen to remove any aggregates, of which there were few.

Figure 2:
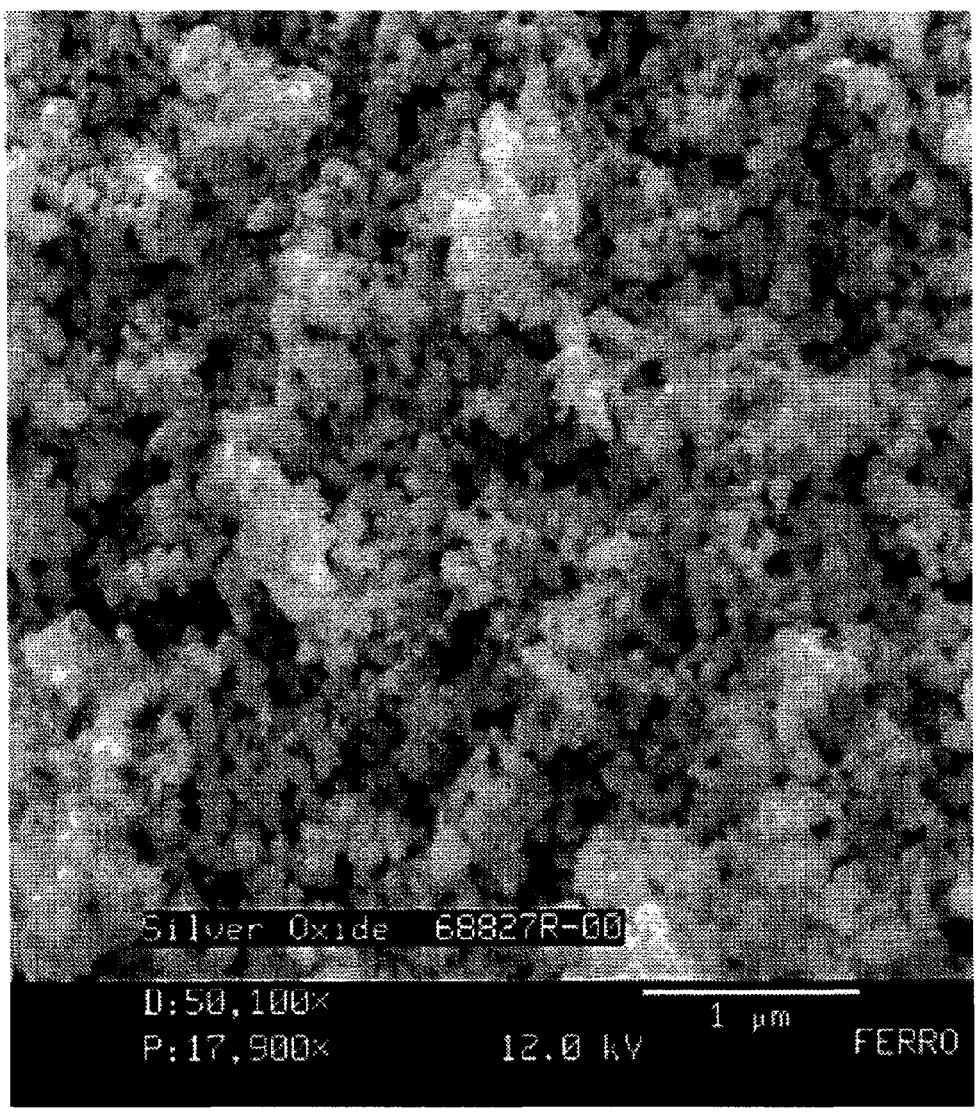
FIG. 2 is an SEM of nanosized silver oxide particles formed according to the invention.

The screened nanosized silver oxide powder was subjected to analytical testing. The surface area of the powder was determined to be 8.77 $m^2$/g. The average particle size of the silver oxide powder was determined to be 95 nm, according to the formula: d (diameter of the particle)=6/(specific surface area)(specific gravity). The average diameter of the particles was also confirmed by SEM measurements (see FIG. 2). The tap density of the particles was determined to be 1.4 g/cc.

The oxygen content of the powder was determined to be 3.65% by weight. The theoretical value is 6.9%. The oxygen content was measured using a LECO RO-116 tester, which can accurately measure oxygen contents within the range of about 2% to 3% by weight, but is not believed to be accurate in measuring oxygen contents higher than higher 3%. Thus, the 3.65% by weight value reported for oxygen content is not believed to be particularly reliable.

The moisture content of the powder was determined to be 2.69% by weight (loss at 110° C.). Ignition loss at 538° C. was determined to be 5.43% by weight. Some of the moisture loss is likely attributable to oxygen loss, due to reduction of the silver oxide to pure silver. It should also be noted that because the nanosized $Ag_2O$ is very fine and therefore has a large surface area, testing moisture content at 110° C. and Ignition loss at 538° C. is difficult. When the powder is heated, the air trapped inside the powder expands and sometimes pushes the powder out of the dish.

The carbon content of the powder was determined to be 7157 ppm (i.e., 0.7157%), which is attributable to the extremely thin layer of oleic acid residue on the surface of the particles. If one presumes that the actual oxygen content of the powder approaches theoretical, which is 6.9% by weight, then one can estimate that the actual moisture content of the powder is 0.5043% (loss at 538° C.+loss at 110° C.–% carbon–oxygen content=5.43%+2.69%–0.7157%–6.9%=0.5043%). Again, due to the extremely small particle size of the powder, the reliability of such testing is questionable.

The silver content of the powder was determined to be in the range of about 91–92% by weight. This is slightly lower than the theoretical amount, which should be 93.1%. The lower value could be due to a small presence of AgOH as a byproduct in the final $Ag_2O$. The $Ag_2O$ purity of the powder is within the range of about 98–99% by weight, so any AgOH present as an impurity is only present in an about of about 1–2% by weight.

The yield of the reaction was calculated to be 92.45%. The loss in yield was mechanical in nature, (i.e. due to loss during washing and filtering) and not chemical. The mother liquor, when tested, showed no presence of Ag.

A heat stability test was conducted on the nanosized silver oxide powder to confirm that it would be safe to transport the material as a dry powder. The powder was heated at different temperatures for various periods of time and then measured to determine whether the powder underwent any weight loss, color change or changes in powder morphology, as determined by examination of SEM's. The testing confirmed that the silver oxide powder was safe to transport as a dry powder. The results of the heat stability testing are summarized in Table 1 below:

TABLE 1

| Temp (° C.) | Soak Time (Min.) | Observations |
|---|---|---|
| 50 | 720 | No Change |
| 55 | 120 | No Change |
| 60 | 140 | No Change |
| 65 | 220 | No Change |
| 70 | 205 | No Change |
| 75 | 300 | No Change |

Figure 3:
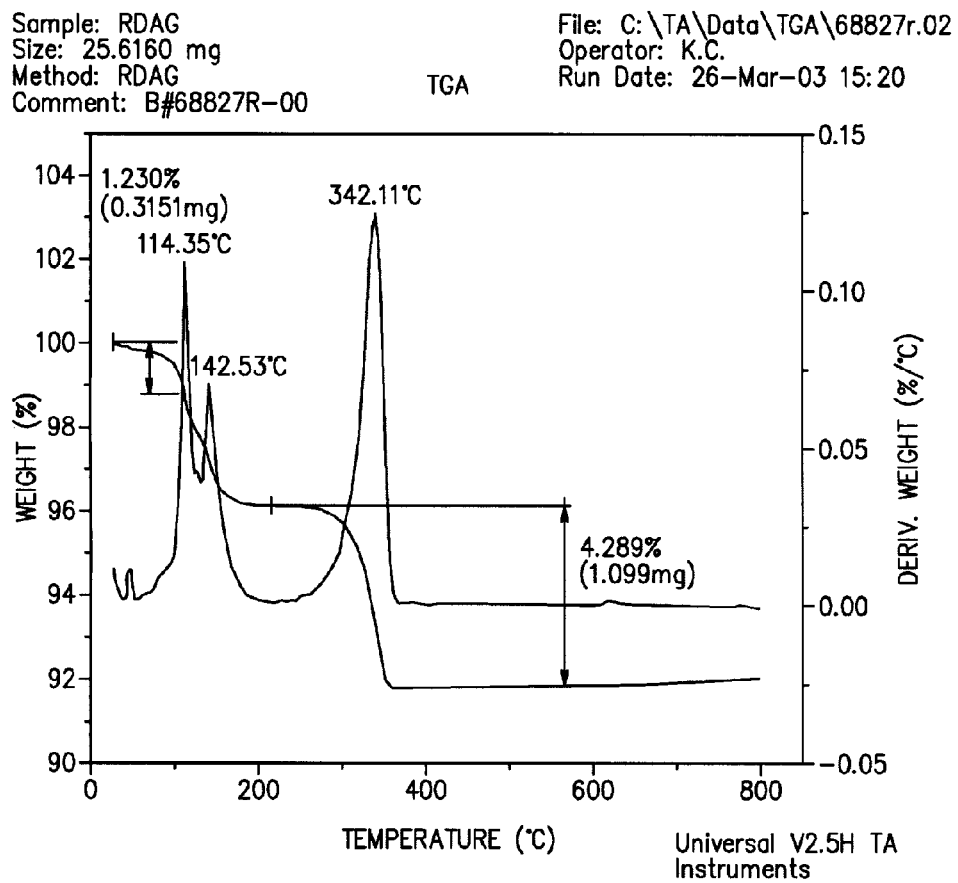
FIG. 3 is a TGA plot for nanosized silver oxide particles formed according to the invention.

Next, the nanosized silver oxide powder according to the invention was subjected to Differential Thermal Analysis (DTA). FIG. 3 shows a plot of temperature difference in ° C./mg versus temperature from about 25° C. to about 1000° C. The exothermic reaction at 130° C. is most likely due to loss of moisture and oleic acid residue. The endothermic reaction at 960° C. is most likely due to melting of pure silver. Since there is no activity at temperatures less than or equal to 100° C., the powder is considered stable and can be transported as a dry powder.

Figure 4:
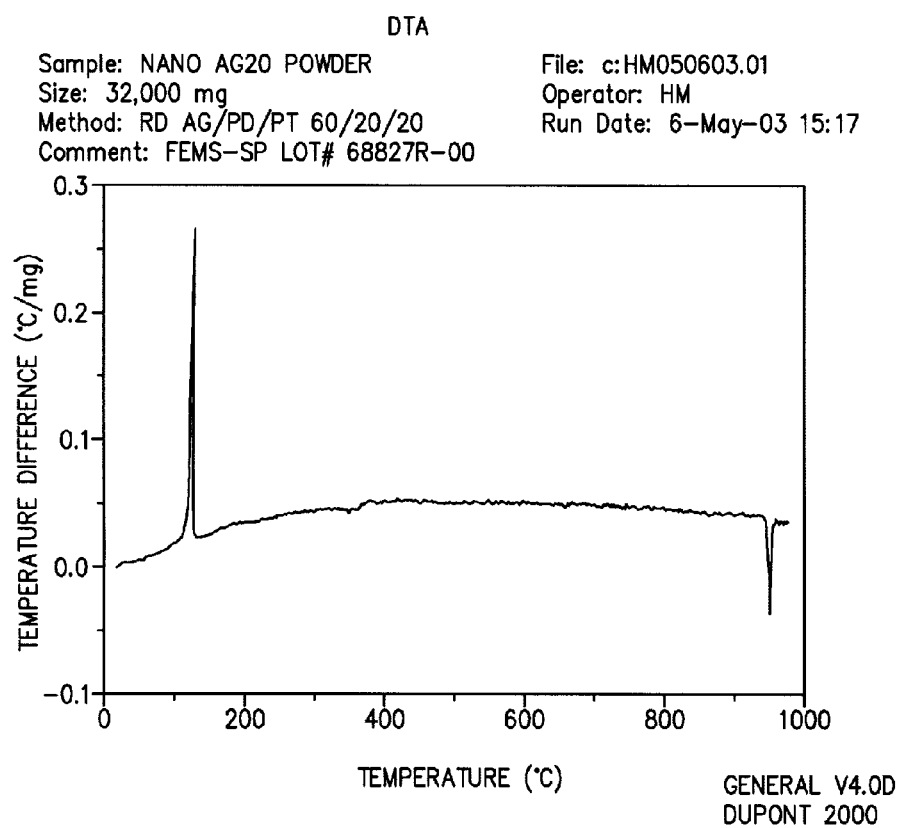
FIG. 4 is a DTA plot for nanosized silver oxide particles formed according to the invention.

Finally, the nanosized silver oxide powder was subjected to Thermal Gravimetric Analysis (TGA). FIG. 4 shows a plot of percent weight loss as a function of temperature from about 25° C. to about 800° C. The results show losses at around 114.35° C. and 142.53° C., which are most likely due to water and oleic acid. The loss observed at 342.11° C. is mostly due to the decomposition of silver oxide into silver metal.

EXAMPLE 2

Silver oxide particles were produced using the same equipment and reaction conditions as described in Example 1, except that the concentration of the $AgNO_3$ and NaOH solutions used in the reaction was varied, as shown in Table 2 below.

TABLE 2

| Sample No. | % Ag in $AgNO_3$ Solution | % $AgNO_3$ in $AgNO_3$ Solution | % NaOH in NaOH Solution |
|---|---|---|---|
| 1 | 5.00 | 7.87 | 5.00 |
| 2 | 9.98 | 15.72 | 5.00 |
| 3 | 13.00 | 20.47 | 13.00 |
| 4 | 20.01 | 31.48 | 20.00 |
| 5 | 31.76 | 50.00 | 50.00 |

The powders were collected, washed and dried as in Example 1 and then subjected to analytical testing. The results of the testing are shown in Table 3 below.

TABLE 3

| Sample No. | $Ag_2O$ Particle Size | % Ag of $Ag_2O$ from TGA | % Ag of $Ag_2O$ Gravimetrically |
|---|---|---|---|
| 1 | ≦100 nm | 91.01 | 91.11 |
| 2 | ≦100 nm | 91.87 | 92.10 |
| 3 | <100 nm | 93.52 | 93.25 |
| 4 | <<100 nm | 93.12 | 93.02 |
| 5 | <<100 nm | 94.45 | 94.13 |

Example 2 shows that as the concentration of the reactants increases, the $Ag_2O$ powder produced in the water/acetone/oleic acid emulsion system becomes finer in size. Also, the % Ag in the $Ag_2O$ powder increases. The theoretical value for % Ag in $Ag_2O$ is 93.1%. The lower-than-theoretical values of % Ag is due to the presence of some AgOH, which occurs as a byproduct at lower reactant concentrations. XRD studies showed that the higher-than-theoretical values for % Ag (at higher reactant concentrations) was caused by the reduction of some of the $Ag_2O$ into pure silver.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A method of forming silver oxide particles, the method comprising:
    mixing a first solution and a second solution together to form a mixture, wherein the first solution comprises a silver salt dissolved in water and the second solution comprises a surfactant dissolved in an organic solvent; and
    contacting the mixture with a base to precipitate silver oxide particles that are at least partially encapsulated by the surfactant.

2. The method according to claim 1 wherein the first solution comprises silver nitrate dissolved in deionized water.

3. The method according to claim 2 wherein the organic solvent is completely miscible with water.

4. The method according to claim 2 wherein the organic solvent is acetone.

5. The method according to claim 1 wherein the surfactant comprises a fatty acid or a derivative of a fatty acid.

6. The method according to claim 5 wherein the fatty acid is oleic acid.

7. The method according to claim 1 wherein the base is selected from the group consisting of sodium hydroxide and potassium hydroxide.

8. The method according to claim 1 further comprising:
    separating the surfactant encapsulated silver oxide particles from the mixture; and
    washing the surfactant encapsulated silver oxide particles.

9. The method according to claim 8 wherein the surfactant encapsulated silver oxide particles are sequentially washed with water and acetone.

10. The method according to claim 8 further comprising:
    drying the washed surfactant encapsulated silver oxide particles.

11. The method according to claim 10 further comprising:
    screening the dried surfactant encapsulated silver oxide particles to remove aggregates.

12. The method according to claim 1 wherein the surfactant encapsulated silver oxide particles have an average particle size of less than or equal to about 100 nm.

13. A composition of matter comprising particles of silver oxide having an average particle size of less than or equal to about 100 nm, wherein the silver oxide particles are encapsulated by a surfactant that inhibits Ostwald ripening.

14. The composition of matter according to claim 13 wherein the surfactant is a fatty acid.

15. The composition of matter according to claim 14 wherein the fatty acid is oleic acid.

16. The composition of matter according to claim 13 wherein the particles of silver oxide are in dry powder form.

17. The composition of matter according to claim 13 wherein the particles of silver oxide are dispersed in a liquid carrier.

* * * * *